US012558729B2

(12) United States Patent
Clement et al.

(10) Patent No.: US 12,558,729 B2
(45) Date of Patent: Feb. 24, 2026

(54) SYSTEM AND METHOD FOR DRILLING A HOLE FOR A COUNTERSINK FASTENER

(71) Applicant: Spirit AeroSystems Inc., Wichita, KS (US)

(72) Inventors: Lawrence Wendell Clement, Wichita, KS (US); Victor Bradley Cunningham, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 848 days.

(21) Appl. No.: 17/835,268

(22) Filed: Jun. 8, 2022

(65) Prior Publication Data

US 2023/0398610 A1    Dec. 14, 2023

(51) Int. Cl.
B23B 51/00        (2006.01)
B23B 35/00        (2006.01)

(52) U.S. Cl.
CPC .......... B23B 51/0018 (2013.01); B23B 35/00 (2013.01)

(58) Field of Classification Search
CPC ..... B23B 51/10; B23B 51/101; B23B 51/102; B23B 51/103; B23B 51/104; B23B 51/105; B23B 51/106; B23B 51/107; B23B 51/108; B23B 51/1085; B23B 51/109; B23B 47/00; B23Q 11/0042; B23Q 11/0046; B23Q 11/005
See application file for complete search history.

(56) References Cited

U.S. PATENT DOCUMENTS

| | | | |
|---|---|---|---|
| 5,772,367 A | 6/1998 | Daniel | |
| 6,170,758 B1 * | 1/2001 | Lee ..................... | B23Q 11/006 239/DIG. 21 |
| 6,471,450 B1 | 10/2002 | Mercier | |
| 6,964,546 B1 | 11/2005 | Vakil | |
| 8,696,267 B2 | 4/2014 | Khurana | |

(Continued)

FOREIGN PATENT DOCUMENTS

| | | |
|---|---|---|
| CA | 2836382 A1 | 11/2012 |
| JP | 5367473 B2 * | 12/2013 |

(Continued)

OTHER PUBLICATIONS

European Search report and Written Opinion, European Patent Office, dated Nov. 14, 2023, 8 pages.

*Primary Examiner* — Nicole N Ramos
(74) *Attorney, Agent, or Firm* — Stinson LLP

(57)        ABSTRACT
A drilling apparatus and method for forming a countersunk hole into a structure. The drilling apparatus may include a drill motor housing assembly, a rotor/spindle assembly, a countersink cage, and a countersink cutter. The drill motor housing assembly may have an inlet air duct, the rotor/spindle assembly may have a first duct and the countersink cage may have a second duct. The countersink cutter may have a plurality of flutes formed into a cutting end thereof. The countersink cutter may also have a third duct formed therethrough and a plurality of exit ducts common with the flutes. Each duct of the drilling apparatus may be fluidly coupled such that inlet air may be forced through the inlet air duct, through the first duct, through the second duct, through the third duct, and then through the plurality of exit ducts during drilling via the drilling apparatus.

14 Claims, 8 Drawing Sheets

(56)         References Cited

U.S. PATENT DOCUMENTS

2004/0101376 A1 *   5/2004   Shemeta  .................. B23Q 5/26
                                                             408/130
2014/0231111 A1 *   8/2014   Lehnert  .................. A61K 9/127
                                                             173/221

FOREIGN PATENT DOCUMENTS

KR           20220026383  A       3/2022
WO      WO-2007071757  A1  *   6/2007   ............. B23B 47/34
WO      WO-2012157468  A1  *   11/2012   ............. B23B 1/108

* cited by examiner

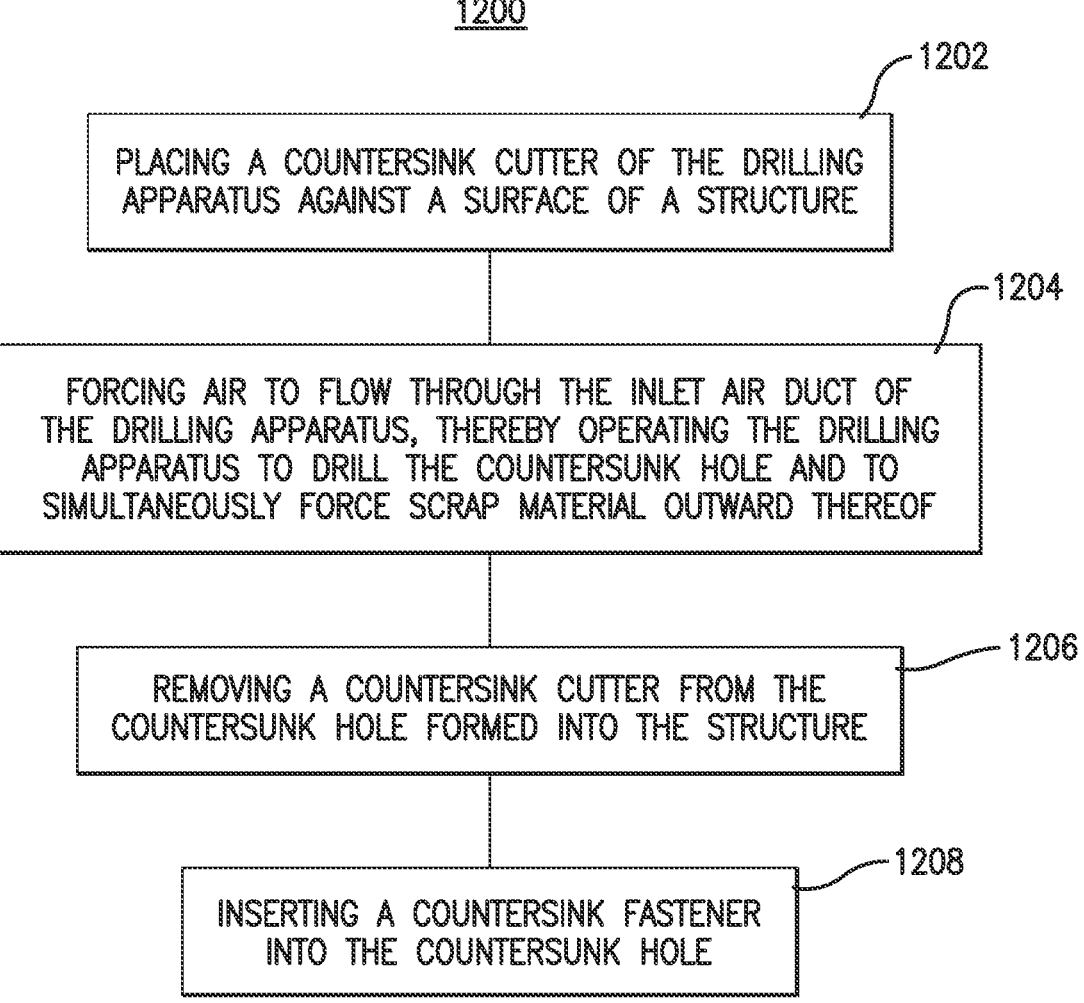

1200

1202
PLACING A COUNTERSINK CUTTER OF THE DRILLING APPARATUS AGAINST A SURFACE OF A STRUCTURE

1204
FORCING AIR TO FLOW THROUGH THE INLET AIR DUCT OF THE DRILLING APPARATUS, THEREBY OPERATING THE DRILLING APPARATUS TO DRILL THE COUNTERSUNK HOLE AND TO SIMULTANEOUSLY FORCE SCRAP MATERIAL OUTWARD THEREOF

1206
REMOVING A COUNTERSINK CUTTER FROM THE COUNTERSUNK HOLE FORMED INTO THE STRUCTURE

1208
INSERTING A COUNTERSINK FASTENER INTO THE COUNTERSUNK HOLE

Fig. 12.

SYSTEM AND METHOD FOR DRILLING A HOLE FOR A COUNTERSINK FASTENER

BACKGROUND OF THE INVENTION

Field of the Invention

Embodiments of the present invention relate to systems and methods for drilling a hole for a countersink fastener. More particularly, embodiments of the present invention relate to a drilling apparatus that forms the countersunk hole while simultaneously clearing resulting scrap material/chips from the countersunk hole and away from a surface being drilled.

Description of the Related Art

Countersink fasteners are fasteners that are installed in such a manner as to be flush with a surface into which they are being inserted. Specifically, a drill assembly for drilling a hole (i.e., a countersunk hole) for countersink fasteners can be configured to enlarge and bevel the rim of (a drilled hole) so that a screw, nail, or bolt can be inserted flush with the surface. For example, aircraft components such as composite and/or metal parts or skins may be joined together using countersink fasteners in order to achieve a substantially smooth surface. However, skin quality issues such as scratches, swirls, nicks, or the like can occur during drilling of the countersunk holes due to resulting scrap material/chips (e.g., metal chips formed by a cutter of the drill).

Prior art attempts to resolve this issue generally require additional hardware added to the drill motors and countersink cages to blow scrap material (e.g., metal chips) away from the skins during the countersinking process for flush mounted fasteners. This additional hardware can add undesired weight to the drill, can undesirably obstruct the mechanic's line of sight and/or can interfere with how the mechanic holds the drill motor and countersink cage, which may lead to discomfort or injury to the mechanic. Thus, a need exists for a system and method for drilling countersunk holes that overcomes the above-described disadvantages of the prior art.

SUMMARY OF THE INVENTION

It has been discovered that clearing scrap material or chips formed during drilling of a countersunk hole can be accomplished without additional hardware by modifying a drilling apparatus to include fluidly coupled ducts, as described herein. In one embodiment, a drilling apparatus for forming countersunk holes may include a rotor/spindle assembly, a countersink cage, and a countersink cutter. The rotor/spindle assembly may have a first duct formed through an axis about which the rotor/spindle assembly rotates. Likewise, the countersink cage may be connected to the rotor/spindle assembly and may have a second duct formed through an axis of the countersink cage and aligned with the first duct of the rotor spindle assembly, such that air forced through the first duct flows into the second duct.

The countersink cutter may have a first end and a second end opposite the first end and may be connected to and housed at least partially in the countersink cage at the first end. Furthermore, the countersink cutter may have a plurality of flutes formed into the second end. The countersink cutter may have a third duct formed along at least part of an axis of the countersink cutter and may have at least one exit duct fluidly coupled with the third duct. The at least one exit duct may terminate at an opening within one of the plurality of flutes of the countersink cutter.

Some embodiments of the drilling apparatus may also comprise a drill motor housing assembly having an inlet air duct. The inlet air duct may be fluidly coupled with the first duct and may selectively provide forced air to the first duct and/or rotatable components of the drilling apparatus. In operation, each duct of the drilling apparatus may be fluidly coupled such that inlet air may be forced through the inlet air duct, through the first duct, through the second duct, through the third duct, and then through the plurality of exit ducts during drilling via the drilling apparatus. The inlet air may serve a dual purpose of both rotating various operational components of the drilling apparatus and blowing scrap material/chips out of the countersunk hole during formation thereof.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figures 8, 9:
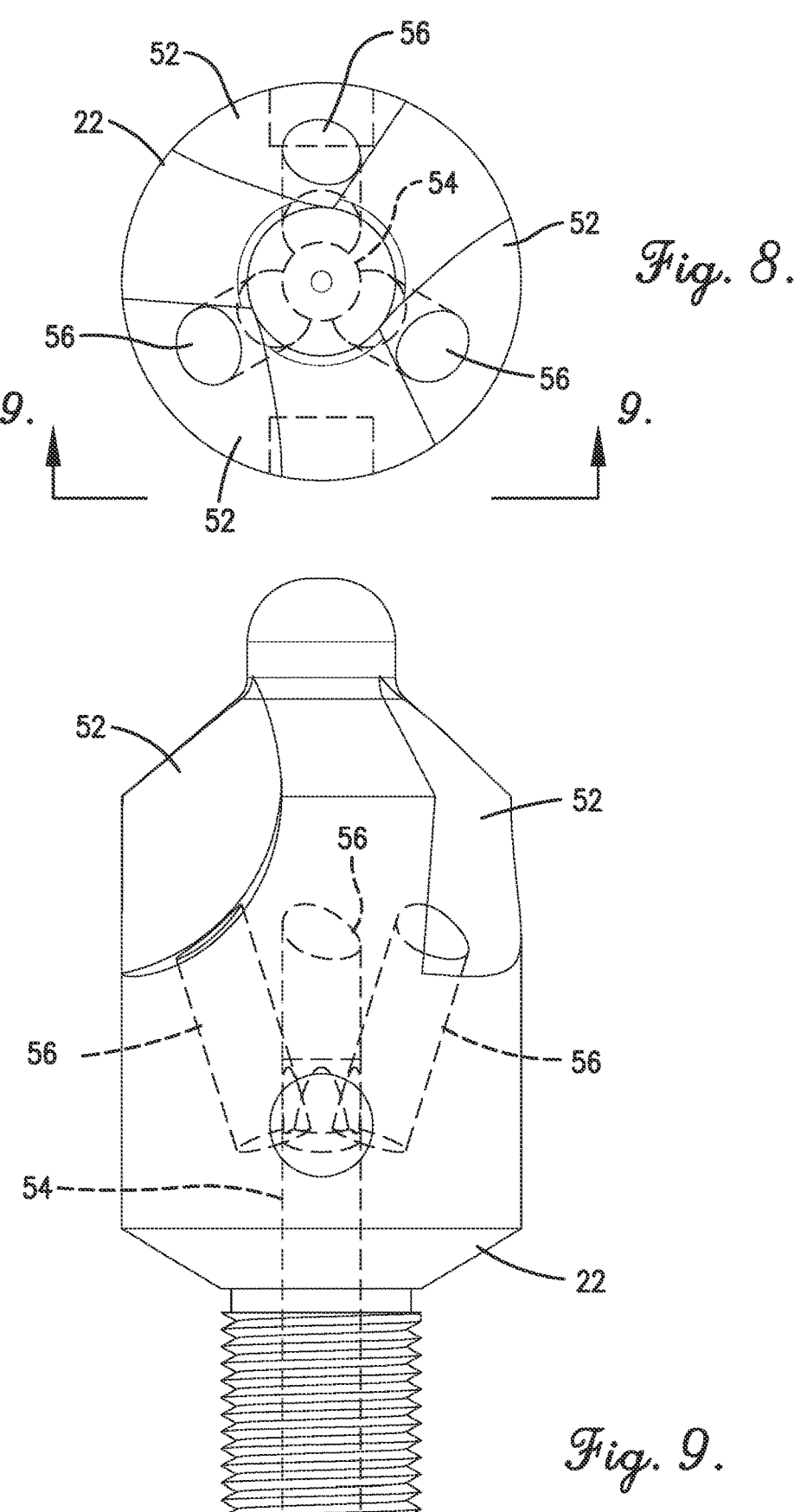
FIG. 8 is a cross-sectional view of the countersink cutter taken along line 8-8 in FIG. 6, in accordance with various embodiments of the present invention.
Figure 10:
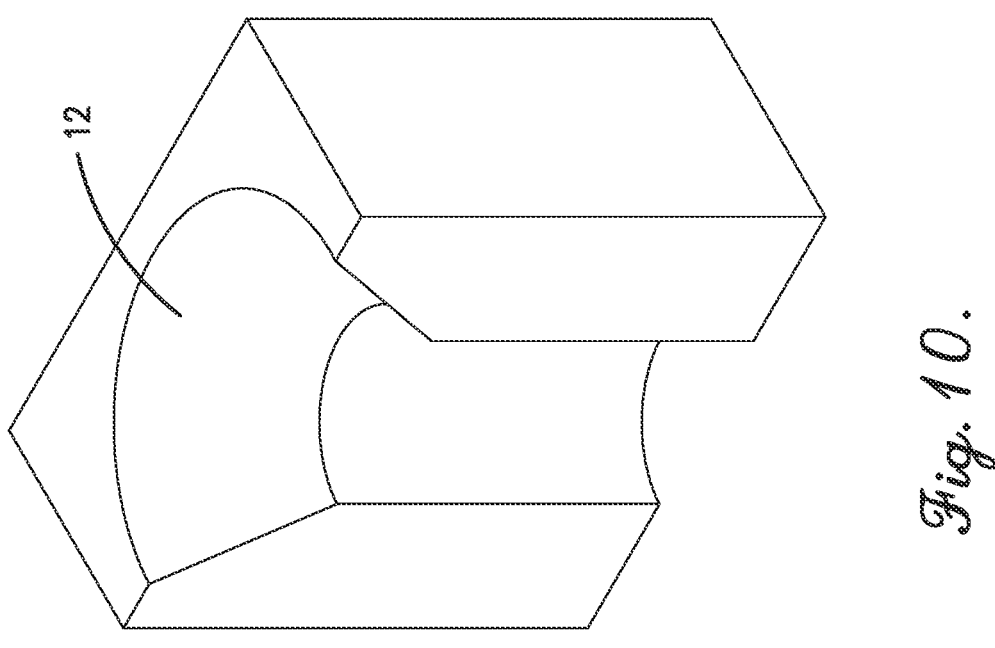

FIG. 9 is a side elevation view of the countersink cutter of FIG. 8 taken along line 9-9, depicting in broken lines a third duct and three exit ducts formed therein, in accordance with various embodiments of the present invention; and FIG. 10 is a flow chart illustrating at least a portion of the steps of an exemplary method for installing a countersink fastener according to various embodiments of the present invention.

The drawing figures do not limit the present invention to the specific embodiments disclosed and described herein.

The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
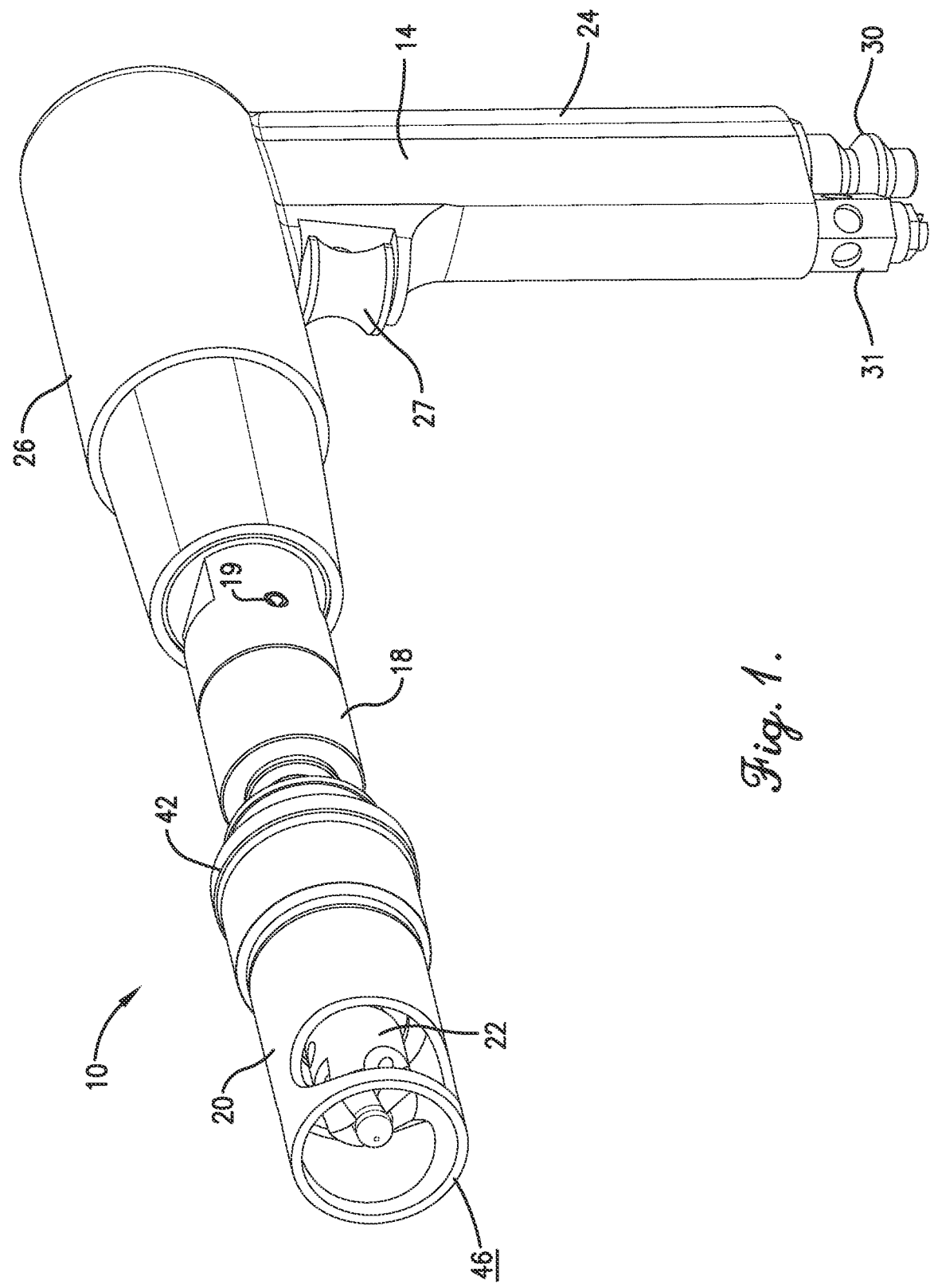
FIG. 1 is a perspective view of a drilling apparatus for drilling a hole for a countersink fastener, constructed in accordance with various embodiments of the present invention.
Figure 2:
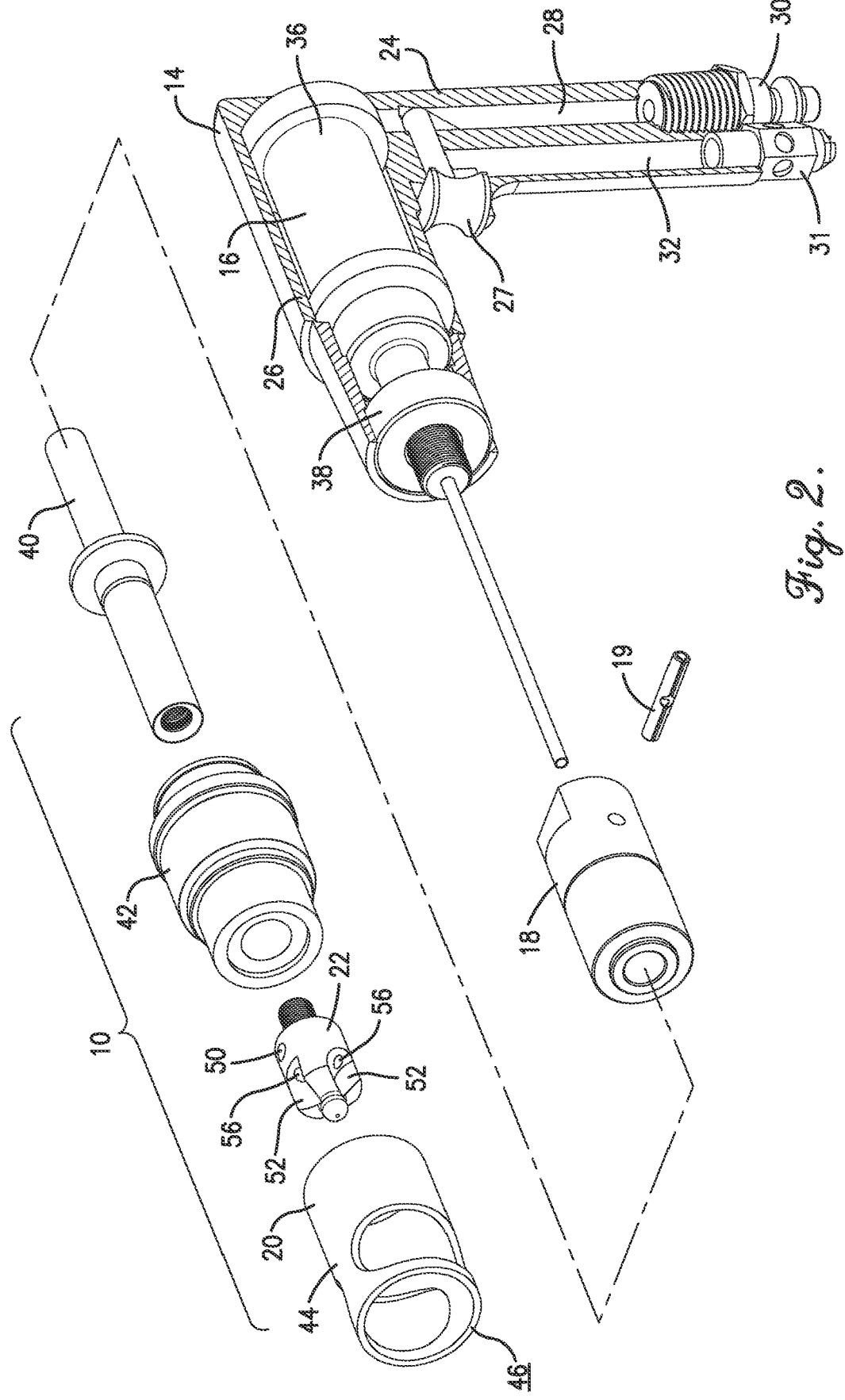
FIG. 2 is an exploded view of the apparatus of FIG. 1, constricted in accordance with various embodiments of the present invention.
Figure 3:
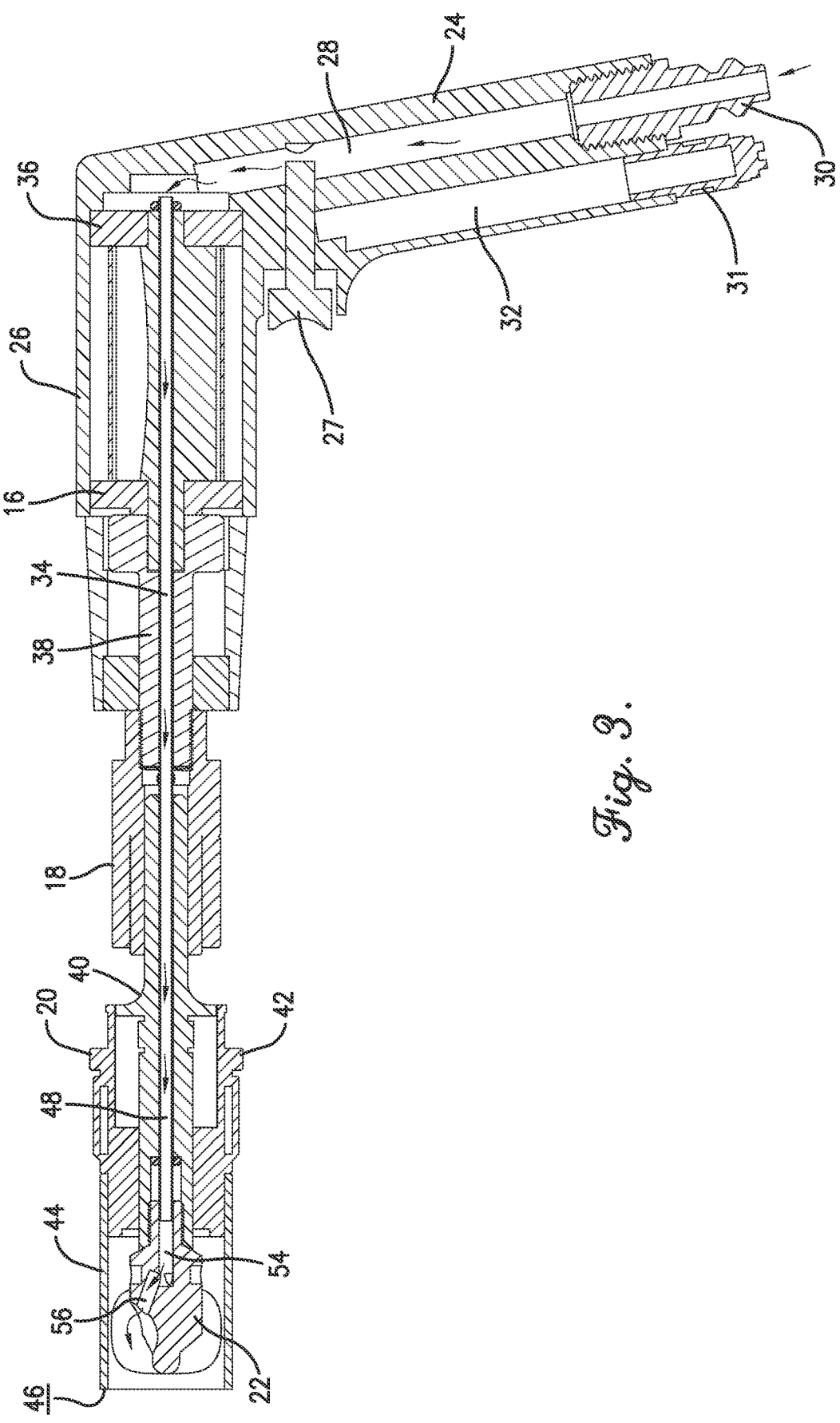
FIG. 3 is a cross-sectional elevation view of the apparatus of FIG. 1, depicting a flow path therethrough, in accordance with various embodiments of the present invention.
Figures 4, 5:
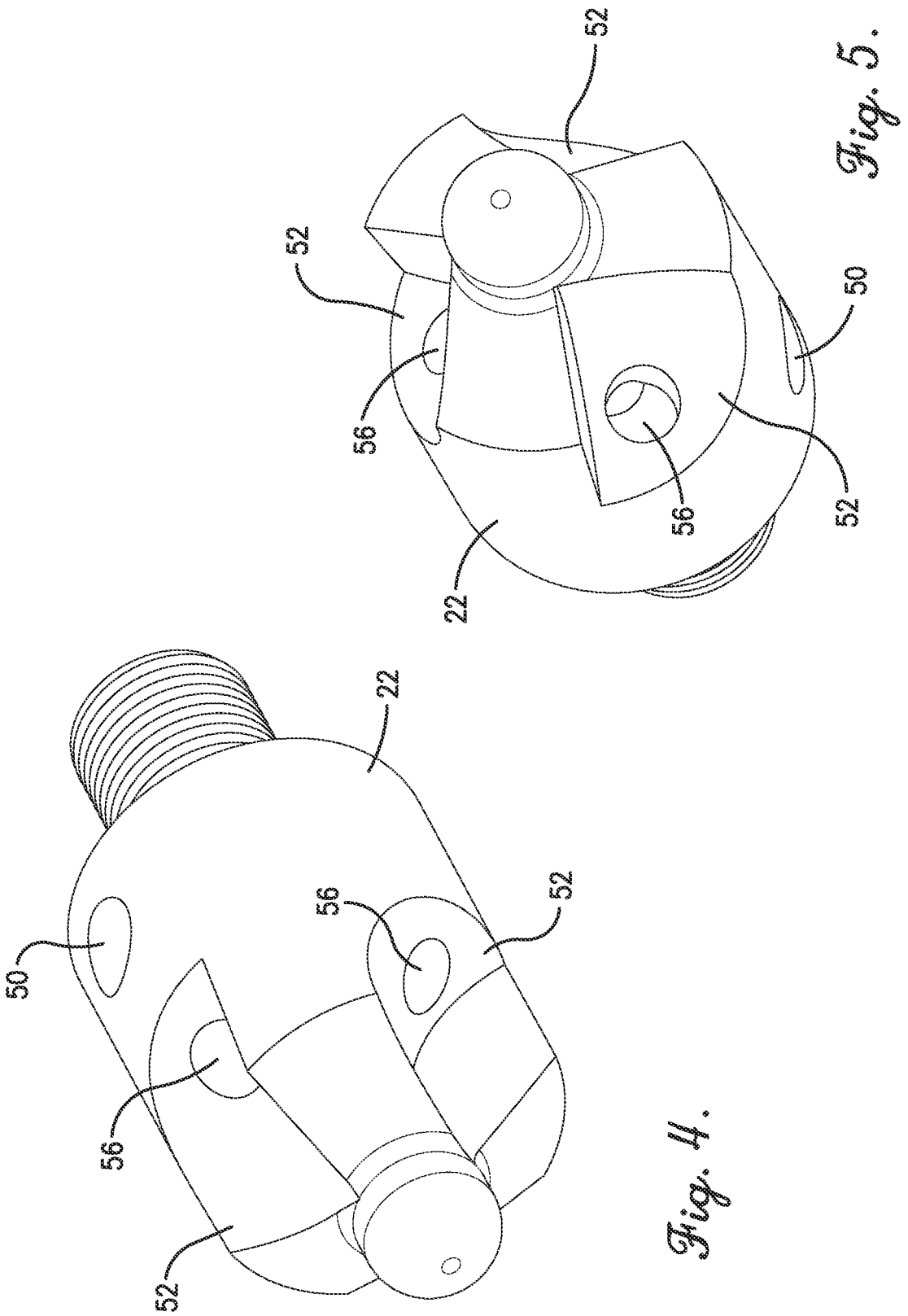
FIG. 4 is a perspective view of a countersink cutter of the drilling apparatus of FIG. 1, in accordance with various embodiments of the present invention.
FIG. 5 is another perspective view of the countersink cutter of the drilling apparatus of FIG. 1, in accordance with various embodiments of the present invention.
Figure 7:
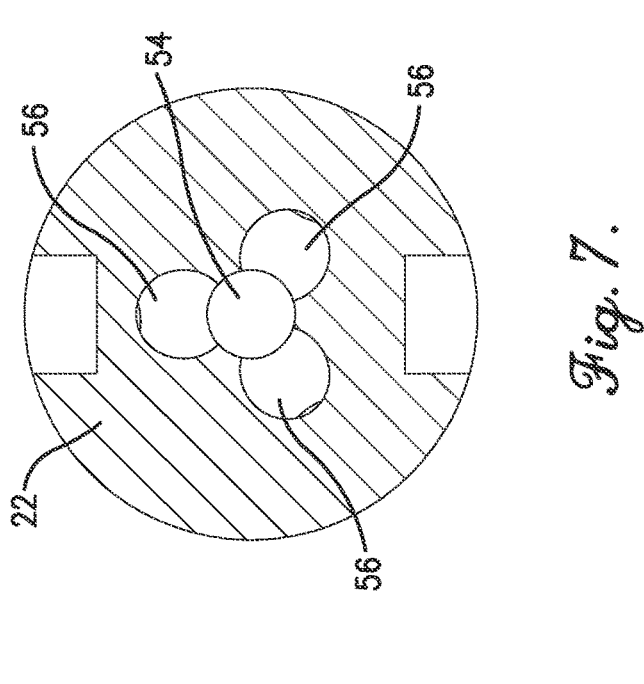
FIG. 7 is a cross-sectional view of the countersink cutter taken along line 7-7 in FIG. 6, in accordance with various embodiments of the present invention.
Figure 6:
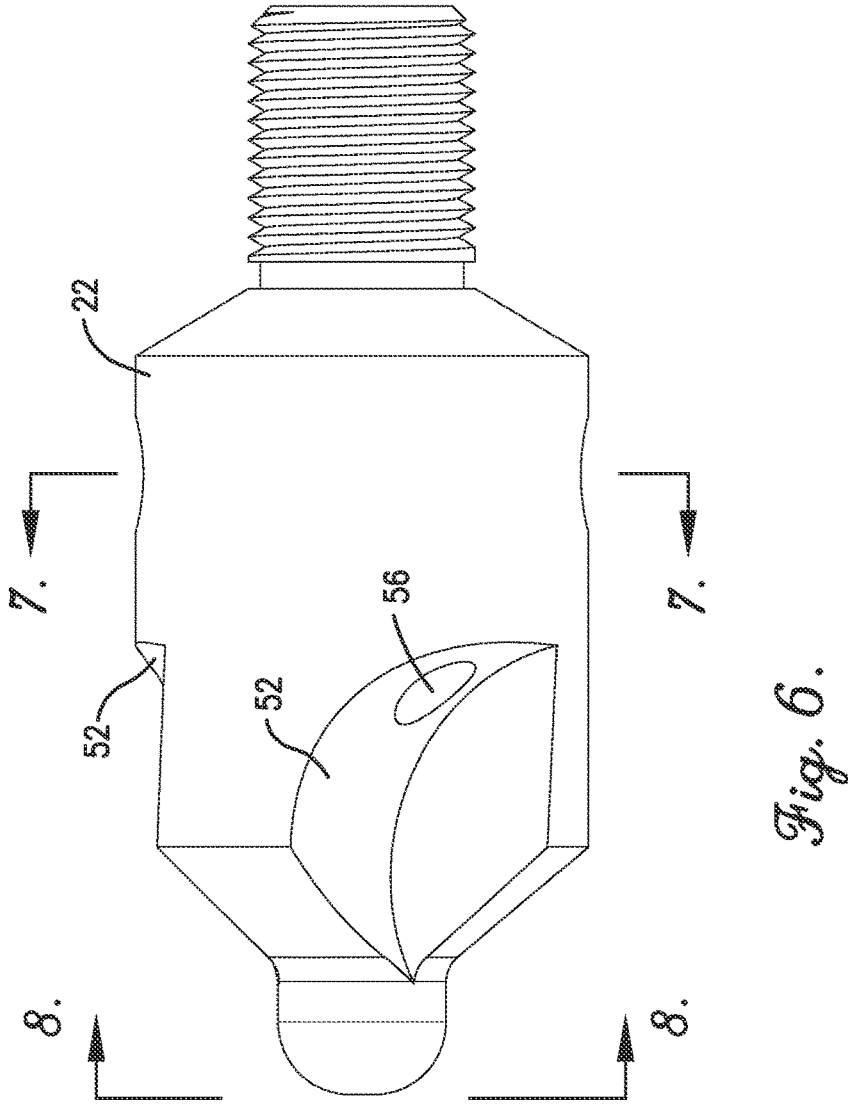
FIG. 6 is a side elevation view of the countersink cutter of FIG. 4, in accordance with various embodiments of the present invention.
Figure 11:
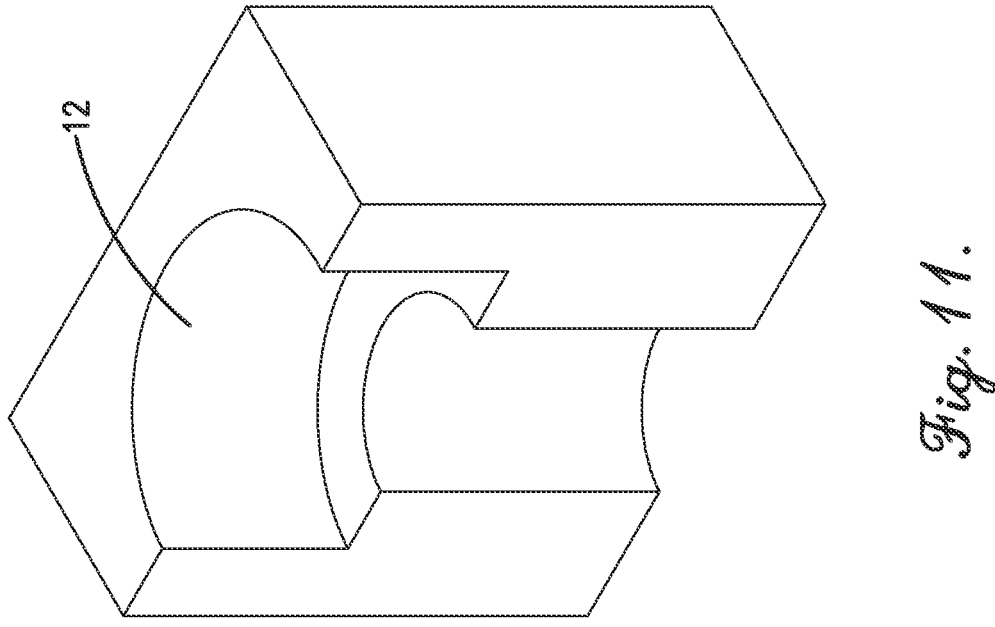

A drilling apparatus 10 constructed in accordance with various aspects of the current invention for drilling a countersunk hole 12 (as depicted in FIGS. 10 and 11) while simultaneously clearing resulting scrap material/chips from the countersunk hole 12 and away from a surface being drilled is depicted in FIGS. 1-3. The drilling apparatus 10 may broadly comprise a drill motor housing assembly 14, a rotor/spindle assembly 16, a chuck 18, a countersink cage 20, and a countersink cutter 22.

The drill motor housing assembly 14 may be any drill motor housing known in the art and may include a handle portion 24 and a housing portion 26. Furthermore, at least one inlet air duct 28 through which inlet air is provided for operating or actuating the drilling apparatus 10 and/or components thereof may be formed through the handle portion 24 and at least partially through the housing portion. For example, an inlet air source (e.g., air compressor hose 30 connected to an air pump), such as a blower, an air compressor, or the like, may be fluidly attached to provide inlet air into the inlet air duct 28. The drill motor housing assembly 14 may also include an actuator, such as a trigger 27, for selectively opening and closing a valve or the like within the inlet air duct 28, thereby selectively allowing and disallowing the flow of pressurized air therethrough.

In some embodiments, the housing portion 26 of the drill motor housing assembly 14 may have a hollow end region opposite where the handle portion meets with the housing portion 26. At least a portion of the rotor/spindle assembly 16 may be placed and nest within the hollow end region of the housing portion 26. While nested within the hollow end region, at least a portion of the rotor/spindle assembly 16 may be actuated to rotate therein, such as via inlet air actuation or the like.

The drill motor housing assembly 14 may further comprise an exhaust port 32 for motor exhaust or the like. The exhaust port 32 may be formed, for example, through the handle portion 24. The drill motor housing assembly 14 may also comprise or have connected thereto a muffler 31, located at an exit of the exhaust port 32. The muffler 31 may be, for example, an adjustable flow-control muffler, which may have an orifice and/or plunger that restricts an amount of air that can exit through the exhaust port 32. This adjustment may be made manually with a screw or thumb screw that is either secured with a jam nut or a spring. Adjustment of the muffler 31 can impact the rotary speed of the rotary components (e.g., rotary motor, rotor/spindle assembly 16, the countersink cutter 22, or the like) as well as the amount of air flow through the countersink cutter 22 (via ducts and openings described below).

The rotor/spindle assembly 16 may be rotatably housed in the drill motor housing assembly 14 (e.g., the hollow end region) and may have a first duct 34 or first hollow channel running down a length of an axis of the rotor/spindle assembly 16. The rotor/spindle assembly 16 may comprise a rotor assembly 36 operably coupled with a spindle 38. The spindle 38 may include, for example, a front bearing and/or a planetary gear driven by the rotor assembly 36.

The chuck 18 is a specialized type of clamp used to hold an object with radial symmetry, such as a cylinder, a hexagon, an octagon or the like. In a drill, the chuck 18 generally holds the rotating tool or drill bit, such as the countersink cutter 22 described herein. The chuck 18 may be a quick release or a long quick change chuck or any apparatus for selectively engaging the countersink cage 20 and/or the countersink cutter 22 to the rotor/spindle assembly 16 (and/or the spindle 38 thereof). Attachment of the chuck may be facilitated via a capillary tube 19.

The countersink cage 20 may include a countersink cage spindle 40, a countersink cage body 42, and a countersink cage foot 44. The countersink cage 20 may be configured for limiting how far the countersink fastener can travel and control the depth of the countersink hole 12 it creates. Specifically, leading surfaces 46 of the countersink cage 20 or the countersink cage foot 44 thereof may come in direct contact with a surface of the workpiece or structure to be drilled during drilling and countersink operations, and the countersink cutter 22 may be aligned within the countersink cage 20 (e.g., the countersink cage foot 44) and extend partially outward beyond the leading surfaces 44. The countersink cage 20 herein may further have a second duct 48 or second hollow channel running down a length of an axis of the countersink cage 20 (i.e., a through hole that is common to the countersink cage spindle 40 and the countersink cage body 42). The second duct 48 or the second hollow channel may be axially aligned with and fluidly coupled to the first duct 34 or the first hollow channel. The second duct 48 allows for the air from the drill motor (i.e., inlet air) to pass through the first duct 34 and the chuck 18 and into the countersink cage 20 via the second duct 48 and then to exit through the front of the countersink cage spindle 48 into ducts of the countersink cutter 22 as described below.

As depicted in FIGS. 1-9, the countersink cutter 22 may be axially aligned within the countersink cage (e.g., within the countersink cage foot 44) and attached thereto (e.g., attached to the countersink cage spindle 40). The countersink cutter 22 may thus be attached to the rotor/spindle assembly 16 via the chuck 18 and/or the countersink cage 20. In some example embodiments, the countersink cutter 22 may have a cross-drilled hole 50 formed therethrough (e.g., perpendicular to a rotational axis of the countersink cutter 22) for selective removal from the countersink cage 20. However, the cross-drilled hole 50 may be filled and/or omitted in favor of other selective attachment devices or methods known in the art. In one example embodiment, the countersink cutter 22 may be a ¼-28 threaded shank with a 120-degree seat.

As depicted in FIGS. 3 and 9, the countersink cutter 22 may have a plurality of flutes 52 at a cutting end thereof and may further have a third duct 54 or third hollow channel running down a portion of a length of the rotational axis of the countersink cutter 22 and terminating at at least one exit duct 56 having an opening in or common to one of the flutes 52 of the countersink cutter 22. In some embodiments, the countersink cutter 22 has three flutes 52 formed into a cutting end portion of the countersink cutter 22, and the exit ducts 56 are formed through each of the flutes 52 and fluidly coupled with the third duct 54 described above. However, any number of flutes 52 may be formed into the countersink cutter without departing from the scope of the technology described herein. Furthermore, exit ducts 56 may be formed into some or all of the flutes 52 of the cutter 22, with each exit duct 56 fluidly coupled with the third duct 54. Inlet air from the drill motor housing assembly 14 may enter a rear of the countersink cutter 22 via the spindle 40 of the countersink cage 20. That air may then be diverted to the exit ducts 56 through third duct 54. The diverted air may thus exit in the flutes 52 of the countersink cutter 22 and reduce/eliminate any scrap material or chips that are generated during the countersinking process that could potentially damage and/or scratch the part being drilled (e.g., a drill-side surface of the skin).

Each of the first duct 34, the second duct 48, the third duct 54, and the exit ducts 56 may have any diameter sufficient to maintain the structural integrity and functionality of the components into which these are formed, while still allowing a flow of air therethrough for scrap material/chips out of the countersunk hole. In one example embodiment, these ducts may have a diameter at or approximately equal to 0.098-inches in diameter. In some embodiments, the ducts may have a diameter between 0.5 inches and 1.5 inches in diameter, or 0.75 inches and 1.25 inches in diameter. However, any diameter may be used without departing from the scope of the technology herein.

Note that although the drilling apparatus 10 and the methods described herein are described in terms of creating a countersunk hole, other similar holes can be similarly created without departing from the scope of the invention. Specifically, a countersunk hole as used herein may also include a chamfered hole as in FIG. 10 or a counterbored hole as in FIG. 11. That is, any countersunk angles may be used for the countersunk holes described herein and formed by the drilling apparatus 10 herein without departing from the scope of the invention.

At least a portion of the steps of a method 1200 for forming a countersunk hole into a structure and/or using the same in accordance with various embodiments of the present invention is listed in FIG. 12. The steps may be performed in the order as shown in FIG. 12, or they may be performed in a different order. Further, some steps may be performed concurrently as opposed to sequentially. In addition, some steps may be omitted. Still further, embodiments of the present invention may be performed using systems other than the drilling apparatus 10 without departing from the spirit of the present invention.

The method 1200 may comprise a step of placing the countersink cutter 22 of the drilling apparatus 10 against a surface of a structure, as depicted in block 1202. Specifically, the drilling end portion and/or a tip centered between the flutes 52 at the drilling end of the countersink cutter 22 may be pressed against the structure to be drilled. The angle at which the countersink cutter 22 may be placed against the surface of the structure may be substantially perpendicular to the surface or may be at any desired angle. Furthermore, the leading surfaces 46 of the countersink cage 20 may also be placed against the surface of the structure during this step 1202. In some embodiments, the countersink cutter cage 20 may be shaped and angled to maintain the countersink cutter 22 in proper alignment with the structure during drilling.

Furthermore, the method 1200 may comprise a step of forcing air to flow through the inlet air duct 28 of the drilling apparatus 10, as depicted in block 1204. For example, forcing the air to flow through the inlet air duct 28 of the drilling apparatus 10 may include a step of opening a source of compressed air fluidly coupled with the inlet air duct 28, such as via attachment to the air compressor hose 30 and/or actuation of the trigger 27. In some embodiments, this is accomplished by manually squeezing the trigger 27 of the drill motor housing assembly 14 of the drilling apparatus 10. As noted above, the inlet air duct 28 may be formed through the drill motor housing assembly 14. Other alternative techniques to squeezing a trigger known in the art for selectively allowing air to be forced into any duct of the drilling apparatus 10 may be used without departing from the scope of the technology described herein. In some embodiments, this step may further include manual adjustments of the air pressure via control of its exhaust flow. Specifically, step 1204 may further comprise adjusting an adjustable flow-control muffler (e.g., the muffler 31) attached to the exhaust port 32 via manual actuation in a manner that increases or decreases an amount of exhaust that flows therethrough. This adjustment may be made before, after, or during squeezing of the trigger for example, or other actuations that open a flow of air into the inlet air duct 28.

The inlet air forced to flow through the air inlet duct 28 may further be forced out therefrom into the first duct 34, then from the first duct 34 into and through the second duct 48, and then from the second duct 48 into and through the third duct 54. From the third duct 54, the air is further forced through one or more of the exit ducts 56 and out through openings at the flutes 52 of the countersink cutter 22. As described above, the first duct 34 may be formed through an axis of the rotor/spindle assembly 16 and the second duct 48 may be formed through an axis of the countersink cage 20. Likewise, the third duct 54 may be formed along at least part of a length of an axis of the countersink cutter 22. The exit ducts 56 may extend from the third duct 54 through the countersink cutter 22 and be fluidly coupled with openings common with flutes 52 of the countersink cutter 22.

The step of forcing air to flow through the inlet air duct 28 may also simultaneously actuate rotation of at least one component of the rotor/spindle assembly 16 and rotation of the countersink cutter 22 for forming a countersunk hole into the structure. Furthermore, the air forced through the openings common with the flutes 54 of the countersink cutter 22 may clear scrap material cut from the structure by the countersink cutter 22 out of the countersunk hole 12 during its formation. Thus, the inlet air forced through the inlet air duct 28 may both operate the drilling apparatus 10 for drilling the countersunk hole 12 and simultaneously clear scrap material/chips from the countersunk hole 12.

In some embodiments, the method 1200 may also include the steps of removing the countersink cutter 22 from the countersunk hole 12 formed into the structure, as depicted in block 1206, and/or inserting a countersink fastener (not shown) into the countersunk hole 12, as depicted in block 1208. The countersink cutter 22 may be removed by moving the drilling apparatus 10 away from the structure once a desired depth of the countersunk hole 12 is achieved (which is also limited by the countersink cage 20) and/or a desired amount of scrap material is blown out of the resulting countersunk hole 12. The resulting countersunk hole 12 may be sized and configured for inserting a specific type of countersink fastener into the countersunk hole 12. In some embodiments, the countersink fastener may be screwed into or otherwise inserted into and fixed within the countersunk hole 12.

Note that the structure into which the countersunk hole 12 may be drilled can be any suitably stable structure and may depend on the materials used for the countersink cutter 22. For example, the countersunk hole 12 may be drilled into a cured composite part, a metal part, a plastic part, a wood part, or any type of structure known in the art of countersink drilling. In some embodiments, the countersunk hole 12 may be drilled into an aircraft component. However, other industries may utilize the drilling apparatus 10 for drilling countersunk holes without departing from the scope of the technology described herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A drilling apparatus for forming countersunk holes, the drilling apparatus comprising:

a rotor/spindle assembly having a first duct formed through an axis about which the rotor/spindle assembly rotates;

a countersink cage connected to the rotor/spindle assembly and having a second duct formed through an axis of the countersink cage and aligned with the first duct of the rotor spindle assembly, such that air forced through the first duct flows into the second duct; and a countersink cutter having a first end and a second end opposite the first end, wherein the countersink cutter is connected to and housed at least partially in the countersink cage at the first end and has a plurality of flutes formed into the second end, wherein the countersink cutter has a third duct formed along at least part of an axis of the countersink cutter, wherein the countersink cutter has at least one exit duct fluidly coupled with the third duct and the at least one exit duct terminates at an opening within one of the plurality of flutes of the countersink cutter, wherein the rotor/spindle assembly comprises a rotor assembly operable to rotate via compressed air and a spindle, wherein the first duct extends through both the rotor assembly and the spindle of the rotor/spindle assembly.

2. The drilling apparatus of claim 1, wherein the at least one exit duct comprises a plurality of exit ducts, each terminating at an opening within a different one of the plurality of flutes of the countersink cutter and each fluidly coupled with the third duct.

3. The drilling apparatus of claim 2, wherein the plurality of exit ducts comprise three exit ducts each common with one of the plurality of flutes of the countersink cutter and each fluidly coupled with the third duct at an angle relative to the third duct and at an angle relative with each other one of the three exit ducts.

4. The drilling apparatus of claim 1, further comprising a drill motor housing assembly having an inlet air duct fluidly coupled to the first duct.

5. The drilling apparatus of claim 4, wherein air forced through the inlet air duct flows through the first duct, the second duct, the third duct, and the at least one exit duct during operation of the drilling apparatus.

6. The drilling apparatus of claim 1, further comprising a chuck configured for coupling at least one of the countersink cage and the countersink cutter to the rotor/spindle assembly.

7. The drilling apparatus of claim 1, wherein drilling apparatus is a blow-through pistol grip motor drill modified with the first duct, the second duct, the third duct, and the at least one exit duct.

8. The drilling apparatus of claim 1, wherein compressed air from a single source is routed to simultaneously actuate the rotor assembly for rotation and to be forced through the first duct, the second duct, the third duct, and the at least one exit duct to clear scrap material away from the countersink cutter.

9. A drilling apparatus for forming countersunk holes, the drilling apparatus comprising:

a drill motor housing assembly having an inlet air duct;

a rotor/spindle assembly having a first duct formed through an axis about which the rotor/spindle assembly rotates within at least a portion of the drill motor housing assembly, wherein the inlet air duct is fluidly coupled with the first duct;

a countersink cage connected to the rotor/spindle assembly and having a second duct formed through an axis of the countersink cage and aligned with the first duct of the rotor spindle assembly, such that air forced through the first duct flows into the second duct; and a countersink cutter having a first end and a second end opposite the first end, wherein the countersink cutter is connected to and housed at least partially in the countersink cage at the first end and has a plurality of flutes formed into the second end, wherein the countersink cutter has a third duct formed along at least part of an axis of the countersink cutter, wherein the countersink cutter has a plurality of exit ducts fluidly coupled with the third duct and the plurality of exit ducts each terminates at an opening within one of the plurality of flutes of the countersink cutter, wherein the rotor/spindle assembly comprises a rotor assembly operable to rotate via compressed air and a spindle, wherein the first duct extends through both the rotor assembly and the spindle of the rotor/spindle assembly.

10. The drilling apparatus of claim 9, wherein the plurality of exit ducts comprise three exit ducts each common with one of the plurality of flutes of the countersink cutter and each fluidly coupled with the third duct at an angle relative to the third duct and at an angle relative with each other one of the three exit ducts.

11. The drilling apparatus of claim 9, wherein air forced through the inlet air duct flows through the first duct, the second duct, the third duct, and the plurality of exit ducts during operation of the drilling apparatus.

12. The drilling apparatus of claim 9, further comprising a chuck configured for coupling at least one of the countersink cage and the countersink cutter to the rotor/spindle assembly.

13. The drilling apparatus of claim 9, wherein drilling apparatus is a blow-through pistol grip motor drill modified with the first duct, the second duct, the third duct, and the at least one exit duct.

14. The drilling apparatus of claim 9, wherein compressed air from the inlet air duct is routed to simultaneously actuate the rotor assembly for rotation and to be forced through the first duct, the second duct, the third duct, and the plurality of exit ducts to clear scrap material from the countersink cutter.

* * * * *